United States Patent [19]

Clark et al.

[11] Patent Number: 4,832,606

[45] Date of Patent: May 23, 1989

[54] DIRECTIONAL PICTURE STORY AIDS FOR CHILDREN TO IDENTIFY LEFT AND RIGHT SHOES

[76] Inventors: Allan Clark; Silvana Clark, both of 3024 Haggin St., Bellingham, Wash. 98226

[21] Appl. No.: 210,989

[22] Filed: Jun. 24, 1988

Related U.S. Application Data

[63] Continuation-in-part of Ser. No. 91,040, Aug. 31, 1987, abandoned.

[51] Int. Cl.<sup>4</sup> .............................................. G09B 19/00
[52] U.S. Cl. .......................................... 434/258; 36/1; 434/185
[58] Field of Search ............... 434/258, 259, 260, 247, 434/397, 184; 40/636; 36/1

[56] References Cited

U.S. PATENT DOCUMENTS

| | | | |
|---|---|---|---|
| 902,573 | 11/1908 | Fleck | 36/1 |
| 3,258,858 | 7/1966 | Cariffe, Jr. | 36/1 |

*Primary Examiner*—William H. Grieb
*Attorney, Agent, or Firm*—Rogers, Howell, Moore & Haferkamp

[57] ABSTRACT

A pair of design elements are suitable for display within the interior of a left and right shoe which make up a pair of children's shoes to aid the child in aligning the shoes for proper fitting onto the correct feet. The individual design elements are themselves complete and, further, are not indicators of proper alignment without their association with a picture story which may comprise a simple declarative sentence such that a mental step is required by the child in order to ascertain that the shoes are properly aligned. This picture story also requires the child to make a visual and directional alignment of the design elements in a left to right orientation which aids the child in gaining reading skills.

4 Claims, 1 Drawing Sheet

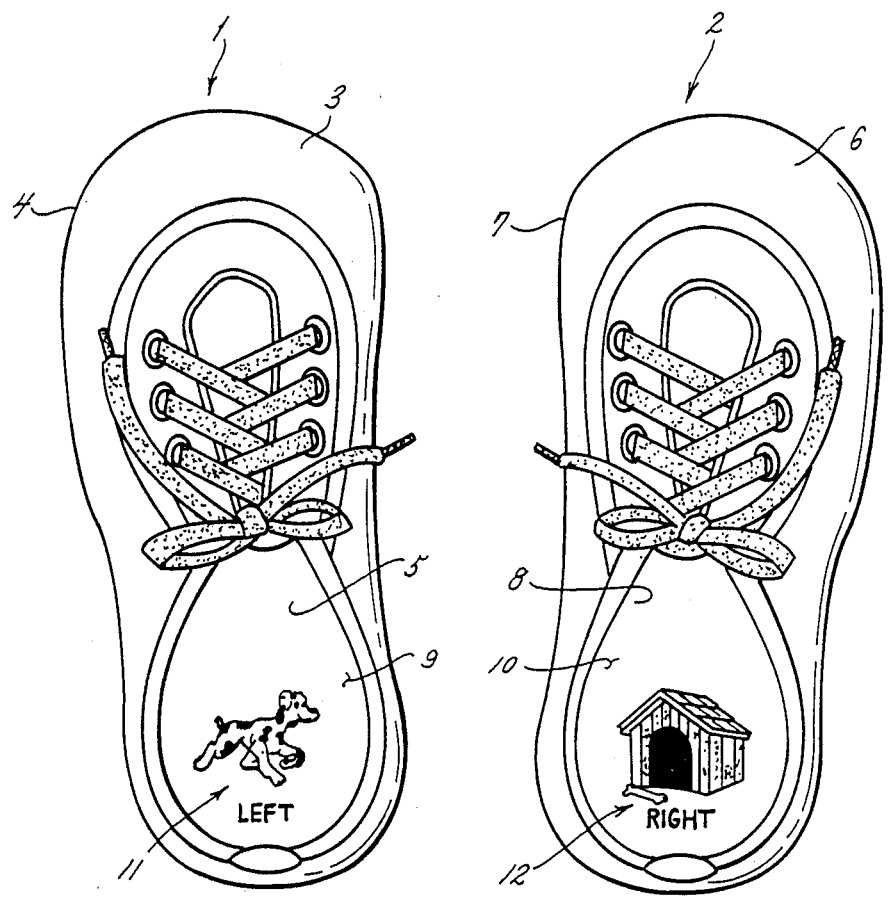

DIRECTIONAL PICTURE STORY AIDS FOR CHILDREN TO IDENTIFY LEFT AND RIGHT SHOES

This application is a continuation-in-part of Ser. No. 091,040 having a filing date of Aug. 31, 1987, and now abandoned.

BACKGROUND AND SUMMARY OF THE INVENTION

Younger children typically find it difficult to choose which shoe of a pair is for the left foot and which shoe is for the right foot such that oftentimes the shoes are put on the wrong feet. This is due not only to the child's not having yet learned left from right but also because of the similarity in shape of left and right shoes for younger children, the shoes being smaller with less pronounced tailoring of the shoe shape for the proper foot. This inability to correctly identify the proper shoe impedes a child's progress in learning to put on his own shoes, but also furthers the amount of time required for adult supervision of the process which in itself impedes a child's learning as he tends to rely upon his parent to make that decision and complete the process of putting the shoes on as it is just as convenient for the parent to do so having once diverted his attention.

In the prior art, others have dealt with this problem by seeking to utilize portions of an integral design which are readily recognized by a child and at the same time which are incomplete when viewed separately. An example of such an approach is shown in U.S. Pat. No. 3,258,858 which depicts the use of a clown's face, one-half of the clown's face being applied to the left shoe and the other half being applied to the right shoe such that the portions are recognizable as a clown's face only with the left shoe and right shoe aligned in their respective proper positions. While this approach does aid a child in aligning shoes, its benefit stops at that point and, the designs are even chosen so as to be readily recognizable to a small child with no thought process.

Still another skill which a maturing child must develop is that of reading, and associating picture elements with abstract thoughts and ideas. Of course, the reading skill involves associating words in a left to right directional orientation. However, with small children having not yet learned to read, the use of words as design elements would be ineffective as an aid for aligning and properly fitting shoes to the correct feet.

In order to solve these and other problems in the prior art, and to provide an educational benefit to a child much beyond the simple task of simply aligning incomplete portions of a design, the inventors herein have succeeded in devising a device which not only aids a maturing child in aligning shoes, but which also encourages the development of reading and thought association skills which require a mental step to further challenge the child and thus further instruct him. Such a thought association is achieved by utilizing separate design elements which are independently complete and alone incapable of identifying a left shoe from a right shoe but, when the shoes are aligned properly, may be associated one to the other to create a picture story which gives a sense of direction of left to right after the story has been recognized and interpreted by the child. This also challenges a child's memory retention as a parent will typically explain the picture story and its directional element to the child during the first few times that the child is exposed to it. Subsequently, it will be left to the child to align the independent design elements in the proper manner so as to complete the picture story in accordance with the explanation given by the parent.

One such example is shown and described below in the preferred embodiment which includes a design of a dog for the left shoe and a design of a doghouse and bone for the right shoe. The associated picture story which explains the link between these design elements and which also adds the directional indicator to them would be the effect that the dog goes into the doghouse. A simple declarative sentence can be used to explain the story, associate the design elements, and provide a simple vehicle for memorization by the child such that the child can later recall it to facilitate association of the design elements and placement of the shoes in the proper manner to assure their being fitted to the proper foot.

As can be appreciated, this technique provides significant advantages over the prior art in that not only is some memorization required, but also logic and a conditioning of the child to associate, at least, design elements in a left to right orientation as a precursor to the learning to read which requires interpreting words in a left to right directional manner.

While the principal advantages and features of the present invention have been briefly described, a more thorough understanding may be obtained by referring to the drawing and detailed description of the preferred embodiment which follow.

BRIEF DESCRIPTION OF THE DRAWING

As shown in the sole FIGURE, a pair of child's shoes are aligned as appropriate for fitting to a child's feet, each shoe depicting a separate, integral design element which together form a picture story.

DETAILED DESCRIPTION OF THE PREFERRED EMBODIMENT

As shown in the drawing, a pair of shoes are comprised of a left shoe 1 and a right shoe 2 and, as is typical with children's shoes, they are quite similar in appearance. As they are of generally conventional construction, further detailed description is not necessary. As shown, the left shoe 1 generally includes a shoe upper 3 mounted on a sole 4 with an opening 5 through which the foot is inserted to put on the shoe, as is well known. Similarly, the right shoe 2 generally includes a shoe upper 6 mounted on a sole 7 with its opening 8 for receiving the right foot. Inner soles, sock liners, or the like are identified as 9 on the left shoe 1 and 10 on the right shoe 2, and may be provided as a matter of design choice of construction by any shoe manufacturer.

A first pictorial design element 11 is shown in the heel area of the insole or sock liner 9 of the left shoe 1 such that it is visible even though the shoe itself may be tied as depicted in the drawing. Additionally, a second design element 12 is shown in the heel area of the insole or sock liner 10 of the right shoe 2. These picture design elements 11, 12 may be either silk screened or imprinted directly onto the insole or sock liner 9, 10, as shown, or they may be imprinted on a self-adhesive label which may be conveniently applied to any insole or sock liner. The self-adhesive labels would be most convenient for later application by parents after purchasing the shoes of choice for their children.

The shoe pair 1, 2 shown in the figure are aligned properly such that the left shoe is in position for fitting onto the left foot and similarly with the right shoe and foot. At the same time, the design elements 11, 12 are separate and independent from each other to the extent that they need not be associated with each other to be complete. In other words, the dog of design element 11 and the doghouse and bone of design element 12 are complete in and of themselves and do not separately, individually, identify whether the shoe to which the design element is applied is a left or right shoe. However, when the design elements 11, 12 are positioned as shown in the figure, and, further, associated with a directional picture story, the design elements together with the picture of story provide an indication to a child as to their proper orientation, and also encourage the child to associate figures in a left to right directional orientation as is desirable in acquiring reading skills. With the design elements 11, 12 as shown in the FIGURE, a simple declarative sentence such as "The dog is going to the doghouse to eat his bone." conveys the impression to the child that the dog should be on the left shoe and hence to the left and the doghouse and bone should be on the right shoe and hence to the right as the child views the shoes. This requires the child to make a mental step in addition to associating complete, and individually independent, design elements in a preselected manner in order to properly align the shoes before they are placed on the feet. Thus, the design elements achieve a two-fold purpose in that they aid in properly aligning the shoes and secondly that they educate the child to orient design elements in a left to right orientation which is the same orientation utilized in reading.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a pair of shoes, each of which being shaped to fit one of either the left or right foot of a child, the improvement comprising a first design element displayed in the left shoe and a second design element displayed in the right shoe, each of said design elements being complete in and of themselves and alone incapable of aiding identification of whether the shoe is for the right or left foot, and, further, being relatively meaningless when the shoes are improperly aligned but which create a picture story when properly aligned with the left shoe on the left and the right shoe on the right, said picture story being characterized by a left to right directional indicator to thereby require a child to make a mental step to properly orient the design elements and shoes, said mental step further reinforcing a left to right orientation useful for reading skills.

2. The device of claim 1 wherein each design element comprises a self-adhesive label suitable for application to the heel area of a shoe.

3. The device of claim 1 wherein each design element comprises an insole, said insole being suitable for insertion within an associated shoe, said design being displayed in the heel area of said insole.

4. The device of claim 1 wherein each design element is applied directly to the heel area of a pair of shoes.

* * * * *